US012659901B2

(12) United States Patent
Liu et al.

(10) Patent No.: US 12,659,901 B2
(45) Date of Patent: Jun. 16, 2026

(54) METHOD AND APPARATUS FOR DETERMINING TIMING ADVANCE VALUE

(71) Applicant: Lenovo (Beijing) Limited, Beijing (CN)

(72) Inventors: Hongmei Liu, Beijing (CN); Zhi Yan, Beijing (CN); Yuantao Zhang, Beijing (CN); Bingchao Liu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 294 days.

(21) Appl. No.: 18/283,910

(22) PCT Filed: Apr. 9, 2021

(86) PCT No.: PCT/CN2021/086204
§ 371 (c)(1),
(2) Date: Sep. 25, 2023

(87) PCT Pub. No.: WO2022/213368
PCT Pub. Date: Oct. 13, 2022

(65) Prior Publication Data
US 2024/0163823 A1      May 16, 2024

(51) Int. Cl.
*H04W 56/00*        (2009.01)
*H04B 7/185*         (2006.01)

(52) U.S. Cl.
CPC .... *H04W 56/0045* (2013.01); *H04B 7/18513* (2013.01)

(58) Field of Classification Search
CPC . H04W 74/0833; H04W 72/23; H04W 72/21; H04W 72/0446; H04W 24/10;
(Continued)

(56) References Cited

U.S. PATENT DOCUMENTS

2018/0242268 A1 *   8/2018   Rune ..................... H04W 36/08
2019/0222327 A1 *   7/2019   Lin ....................... H04W 24/10
(Continued)

FOREIGN PATENT DOCUMENTS

CN        111770565 A      10/2020
CN        111800851 A      10/2020
(Continued)

OTHER PUBLICATIONS

PCT/CN2021/086204 , "International Preliminary Report on Patentability", PCT Application No. PCT/CN2021/086204, Oct. 19, 2023, 5 pages.
(Continued)

*Primary Examiner* — Khalid W Shaheed
(74) *Attorney, Agent, or Firm* — FIG. 1 Patents

(57)                ABSTRACT
Embodiments of the present application are related to a method and apparatus for determining TA value. An exemplary method according to some embodiments of the present application includes: receiving first downlink signalling information indicating a TA associated value at a first time instance; determining a reference TA value based on a second time instance, wherein the second time instance is determined based on second downlink signalling or predefined information; and determining a TA value for uplink transmission based on the TA associated value and the reference TA value.

20 Claims, 6 Drawing Sheets

(58) Field of Classification Search
CPC ............. H04W 74/006; H04W 56/001; H04W
72/1268; H04W 72/04; H04W 56/0005;
H04W 56/00; H04W 84/06; H04W
56/0045; H04B 7/18513; H04L 5/0053;
H04L 5/0048; H04L 5/001
See application file for complete search history.

(56) References Cited

U.S. PATENT DOCUMENTS

| | | | |
|---|---|---|---|
| 2020/0187302 A1* | 6/2020 | Si | ............................ H04L 5/10 |
| 2022/0167297 A1* | 5/2022 | Wang | .................. H04W 56/00 |
| 2022/0225257 A1* | 7/2022 | Laselva | ............ H04W 56/0095 |

FOREIGN PATENT DOCUMENTS

| | | | | |
|---|---|---|---|---|
| CN | 111919503 | A | 11/2020 | |
| CN | 112154707 | A | 12/2020 | |
| WO | WO-2019048038 | A1 * | 3/2019 | ........ H04W 56/0045 |
| WO | 2020191762 | A1 | 10/2020 | |

OTHER PUBLICATIONS

PCT/CN2021/086204 , "International Search Report and Written Opinion", PCT Application No. PCT/CN2021/086204, Jan. 6, 2022, 6 pages.
SONY , "Enhancement for UL time synchronization", 3GPP TSG RAN WG1 #104b-e, R1-2103305, e-Meeting [retrieved Nov. 20, 2023]. Retrieved from the Internet <https://www.3gpp.org/ftp/tsg_ran/WG1_RL1/TSGR1_104b-e/Docs>, Apr. 2021, 7 pages.

* cited by examiner

Network side                      Remote side

METHOD AND APPARATUS FOR DETERMINING TIMING ADVANCE VALUE

TECHNICAL FIELD

Embodiments of the present application generally relate to wireless communication technology, and more particularly related to timing advance (TA) value determination and indication.

BACKGROUND

To extend the coverage and availability of wireless communication systems (e.g., 5G systems), satellite and high-altitude platforms may be utilized as relay devices in communications related to ground devices such as user equipment (UE). Network or segment of network using radio frequency (RF) resources on board a satellite or an airborne aircraft may be referred to as a non-terrestrial network (NTN). In the NTN, some or all functions of a base station (BS) may be deployed in a satellite or an airborne aircraft.

It has been agreed that the combination of open-loop and close-loop TA control will be supported in the NTN, wherein the open-loop TA control means that the UE calculates the TA value by the UE itself and the close-loop TA control" means that the TA value is indicated by the network side, e.g., a gNB. Accordingly, similar to legacy NR network, there is also contradiction between open loop TA and close-loop TA by signalling from the gNB in the NTN.

However, there is large propagation delay in the NTN due to the high attitude of satellites, and the open-loop TA control in the NTN is by global navigation satellite system (GNSS) rather than synchronization signal block (SSB) detection. The solution for solving the contradiction between open-loop and close-loop TA control for legacy NR network provided in TS38.213 cannot be applied in the NTN.

Thus, it is desirable to provide a technical solution to improve the TA determination or indication mechanism, especially in the NTN to adapt the industry trend.

SUMMARY OF THE DISCLOSURE

One objective of the present application is to provide a method and apparatus for determining TA value, especially in the NTN.

According to an embodiment of the present application, a method may include: receiving first downlink signalling information indicating a TA associated value at a first time instance; determining a reference TA value based on a second time instance, wherein the second time instance is determined based on second downlink signalling information or predefined information; and determining a TA value for uplink transmission based on the TA associated value and the reference TA value.

According to another embodiment of the present application, a method may include: transmitting first signalling information indicating a TA associated value, which is to be received in a UE at a first time instance; determining a reference TA value based on a second time instance, wherein the second time instance is determined based on second signalling information or predefined information; and determining a TA value for uplink transmission based on the TA associated value and the reference TA value.

In some embodiments of the present application, determining a reference TA value based on the second time instance may include: determining the reference TA value based on geographical positions of a satellite and UE at the second time instance.

In some other embodiments of the present application, determining a reference TA value based on the second time instance may include: determining the second time instance based on a time instance associated with a UL transmission and a predefined or configured differential value, wherein the predefined or configured differential value is between the time instance for reception of the UL transmission and the second time instance.

In some yet other embodiments of the present application, the second downlink signalling information may indicate a time domain duration to determine the second time instance. The time domain duration is determined by at least one of: a cell specific time domain offset between downlink reception and uplink transmission, the largest propagation delay between a satellite and all UEs within a coverage area, and a common timing offset. The second time instance is determined to be a time instance for a latest uplink transmission before that calculated by the first time instance minus the time domain duration according to some embodiments of the present application. The second time instance is determined by a predefined or configured value and a time instance for a latest uplink transmission before that calculated by the first time instance minus the time domain duration according to some other embodiments of the present application. The predefined or configured value may be a propagation delay between a satellite and a UE, or the largest propagation delay between a satellite and all UEs within a coverage area.

In some yet other embodiments of the present application, the second time instance is determined to be the same as the first time instance.

In some yet other embodiments of the present application, the second time instance is determined by the first time instance and a predefined or configured value. The predefined or configured value is determined by a propagation delay between a satellite and a UE, or is within a range in time domain between a time instance calculated by the first time instance minus the largest propagation delay within a coverage area and the first time instance. The predefined or configured value may be in a unit of millisecond, second, slot, symbol or number of uplink transmissions. In the case that the predefined or configured value is in a unit of slot or symbol, a reference subcarrier spacing (SCS) is configured or determined based on frequency band for the uplink transmission. In the case that the predefined or configured value is in the unit of number of uplink transmissions, the predefined or configured value is determined by counting each uplink transmission or every M uplink transmissions, wherein M is a nature integer larger than 1. According to some embodiments of the present application, M is determined by a number of uplink transmissions in a measurement gap.

In some yet other embodiments of the present application, the second time instance is determined by a time instance for reception of the second downlink signalling information. For example, the second time instance is determined by a time domain instance for a nearest uplink transmission after the time instance for reception of the second downlink signaling information. The second downlink signalling information is indicated by a physical downlink control channel (PDCCH) or a channel state information (CSI)-reference signal (RS). The nearest uplink transmission is a physical uplink control channel (PUCCH), physical uplink shared channel (PUSCH), physical random access channel (PRACH) or sounding reference signal (SRS). The nearest uplink transmission is transmitted in a preconfigured resource or scheduled by downlink control signalling. The time domain difference between reception of the second downlink signalling information and transmission of the nearest uplink transmission is configured or predefined. In another example, the second time instance is further determined by a time domain duration larger than or equal to a propagation delay between a satellite and a UE. The second time instance is a time instance for a latest uplink transmission before the time instance for reception of the second downlink signalling information minus the time domain duration. The time domain duration is configured or determined based on graphical positions of the satellite and a UE, or the time domain duration is determined by at least one of: a cell specific time domain offset between downlink reception and uplink transmission, the largest propagation delay between a satellite and all UEs within a coverage area, and a common timing offset.

In addition, some embodiments of the present application also provide an apparatus for performing a method according to an embodiment of the present application, e.g., a method as stated above. An exemplary apparatus may include: at least one non-transitory computer-readable medium having stored thereon computer-executable instructions; at least one receiving circuitry; at least one transmitting circuitry; and at least one processor coupled to the least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application provide a novel solution for determining TA value, which can at least solve the technical problems on determining TA value caused by the contradiction between open-loop and close-loop TA control, especially in the NTN, and will facilitate the deployment and implementation of NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE), and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
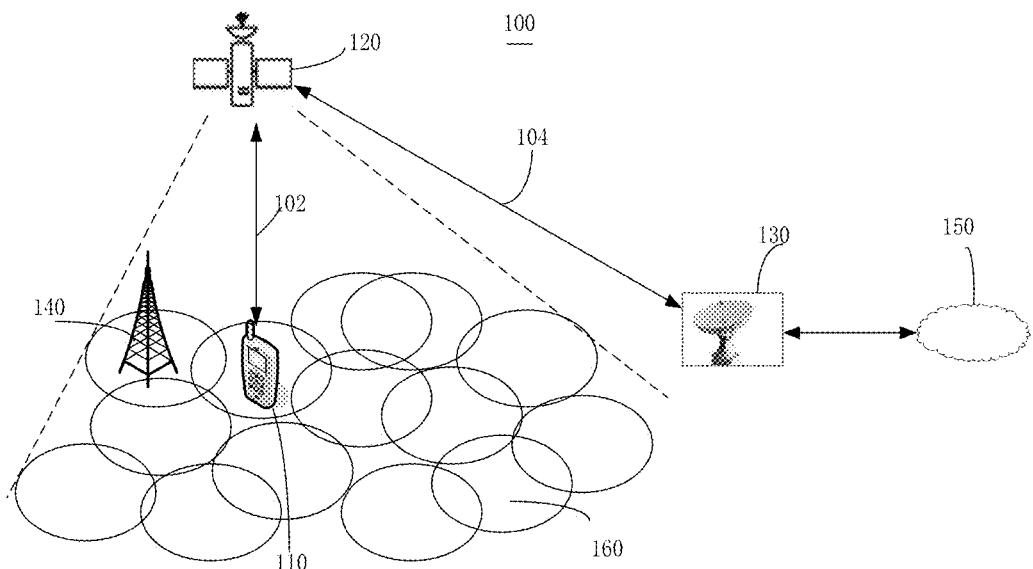
FIG. 1 is a schematic diagram illustrating an exemplary wireless communication system according to some embodiments of the present application.

FIG. 1 is a schematic diagram illustrating an exemplary wireless communication system according to some embodiments of the present application.

Referring to FIG. 1, the shown exemplary wireless communication system is an exemplary NTN 100 in which the techniques, processes and methods described herein can be implemented, according to various embodiments of the present application. In other embodiments of the present application, the wireless communication system may be other type of networks.

Generally, to extend the coverage and availability of wireless communication systems, some or all functions of a BS may be deployed in a satellite. That is, in the NTN, a satellite may be also referred to as a BS. For example, a satellite may generate multiple beams over a certain service area. The service area corresponding to a beam may be referred to a beam coverage area, and the service area corresponding to multiple beams (part or all of the beams generated by a satellite) may be referred to a cell coverage area. Each beam is generated by a spatial domain filter, and can be associated with a resource, such as CSI-RS, SSB, or SRS. For example, from the perspective of a UE, a DL beam may be associated with a spatial domain reception filter, and an uplink UL beam may be associated with a spatial domain transmission filter. Although the term "beam" has been commonly used in the work items of 3GPP, it has not been written into 3GPP standards or specifications. In the future, the term "beam" may develop into other wording, e.g., the term "beam" may be represented by spatial relation information etc. Such changes should not be used to limit the scope of the present application.

The concept of cell with respect to a terrestrial BS may similarly apply to a satellite serving as a BS. Such network or segment of network using RF resources on board a satellite or an airborne aircraft may be referred to as NTN. Hereafter, the BS(s) illustrated in the specification all cover any type of devices with the substantial function of a BS, including a satellite 120, a terrestrial BS 140 or the like.

As shown in FIG. 1, the NTN 100 includes at least one UE 110 and at least one satellite 120. The UE(s) 110 communicates with the satellite 120 over a service link 102, which has both an uplink from the UE 101 to the satellite 120 and a downlink from the satellite 120 to the UE 110. The UE(s) 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 110 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 110 includes wearable devices, such as smart watches, fitness bands, optical head-mounted displays, or the like. Moreover, the UE(s) 110 may be referred to as a subscriber unit, a mobile, a mobile station, a user, a terminal, a mobile terminal, a wireless terminal, a fixed terminal, a subscriber station, a user terminal, or a device, or described using other terminology used in the art.

Satellite(s) 120 may include low earth orbiting (LEO) satellites, medium earth orbiting (MEO) satellites, geostationary earth orbiting (GEO) satellites, as well as highly elliptical orbiting (HEO) satellites. In some embodiments of the present application, alternatively, a satellite 120 may be an unmanned aircraft systems (UAS) platform. The UAS platform(s) may include tethered UAS and lighter than air (LTA) UAS, heavier than air (HTA) UAS, and high altitude platform (HAP) UAS.

The satellite 120 may provide a plurality of geographic areas (footprint) 160 for serving UEs 110 located in one or more of the geographic areas. A geographic area 160 can be associated with a cell, and can also be associated with a beam. When the geographic area 160 is associated with a cell, it can be named as a "cell footprint." When the geographic area 160 is associated with a beam, it can be named as a "beam footprint." In FIG. 1, exemplary UE(s) may be a normal mobile terminal, which can wirelessly communicate with the satellite 120 via a communication link, such as service link or radio link according to a NR access technology (e.g., a NR-Uu interface) or other technology. As also shown in FIG. 1, the satellite 120 may also communicates with a gateway 130 or an on earth (terrestrial) BS 140 via a communication link, which may be a feeder link 102 or radio link according to the NR access technology or other technology. According to various embodiments, the satellite 120 may be implemented with either a transparent or a regenerative payload. When the satellite 120 carries a "transparent" payload, it performs only radio frequency filtering, frequency conversion and/or amplification of signals on board. Hence, the waveform signal repeated by the satellite is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload, all or part of base station functions (e.g., a gNB, eNB, etc.) are implemented on board.

The gateway 130 may be coupled to a data network 150 such as, for example, the Internet, terrestrial public switched telephone network, mobile telephone network, or a private server network, etc. The gateway 130 and the satellite 120 communicate over a feeder link 120, which has both a feeder uplink from the gateway to the satellite 120 and a feeder downlink from the satellite 120 to the gateway 130. Although a single gateway 130 is shown, some implementations will include more gateways, such as five, ten, or more.

One or more terrestrial BSs 140 (i.e., not airborne or spaceborne) are provided within a typical terrestrial communication network, which provides geographical radio coverage, wherein the UEs 110 that can transmit and receive data within the radio coverage (cell coverage) of the terrestrial BS 140. In the terrestrial communication network, a terrestrial BS 140 and a UE 110 can communicate with each other via a communication link, e.g., via a downlink radio frame from the terrestrial BS 140 to the UE 110 or via an uplink radio frame from the UE 110 to the terrestrial BS 140.

Although a limited number of UEs 110 and satellites 120 etc., are illustrated in FIG. 1, it is contemplated that the wireless communication system 100 may include any number of UEs 110, satellites 120, and/or other network components.

In the NTN, a UE can calculate the TA value based on its position and satellite ephemeris. However, whether the TA calculation is autonomously determined by the UE itself or controlled by the gNB is to be further studied.

In addition, it has been agreed that the combination of open-loop and close-loop TA control will be supported in the NTN. In a NR system, there is also combination of both open-loop and close-loop TA. In the NR system, the open-loop TA is based on SSB detection, and the close-loop TA is by media access control (MAC) control element (CE) signaling indicated by gNB. The determination of the MAC CE signalling content is by detection of uplink signals. To solve the contradiction between open-loop and close-loop TA control, TS38.213 has provided a solution applied in legacy NR, which provides "If the received downlink timing changes and is not compensated or only partly compensated by the uplink timing adjustment without timing advance command as described in TS 38.133, the UE changes N_TA accordingly." Specifically, in legacy NR, the downlink timing change is detected by SSB, and the close-loop TA control is by the reception of MAC CE) signalling. Accordingly, whether there is compensation or not can be determined by the time domain order of SSB and MAC CE. If SSB is received after UL transmission and before MAC CE, there is compensation; otherwise, there is no compensation. However, due to the high attitude of satellites, there is large propagation delay in the NTN, especially, a propagation delay between a satellite (such as, the satellites 120 in FIG. 1) and a UE (such as, the UE 110). Besides, the open-loop TA control in the NTN is by GNSS rather than SSB detection. Thus, the above solution provided in TS38.213 cannot solve the contradiction between open-loop and close-loop TA control in the NTN.

Given the above, the current TA determination or indication mechanism needs to be improved to adaptive to the NTN. Accordingly, methods and apparatuses according to embodiments of the present application are proposed to at least solve the above technical problems.

Figure 2:
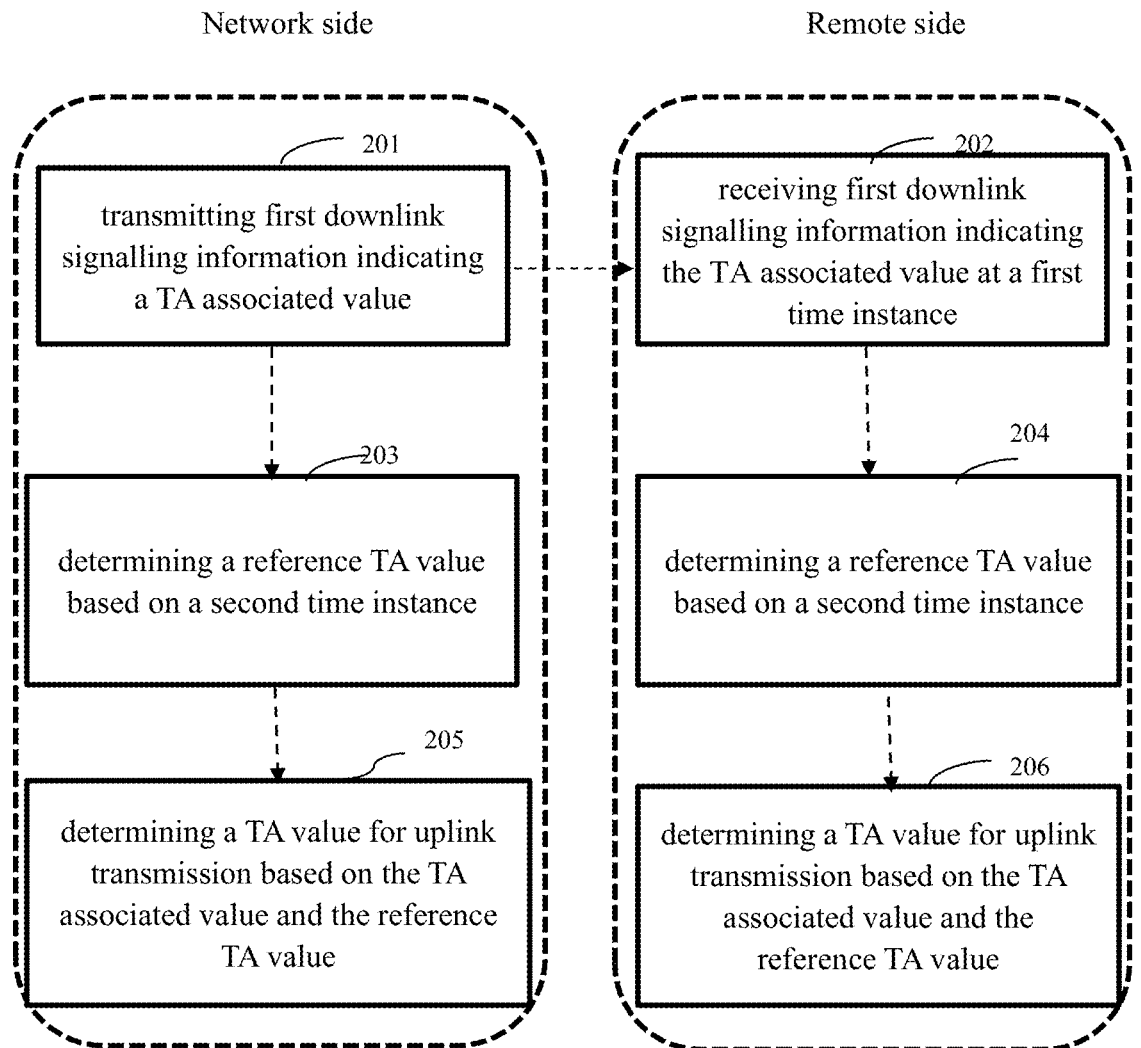
FIG. 2 illustrates a flow chart of a method for determining TA value according to some embodiments of the present application.

FIG. 2 illustrates a flow chart of a method for determining TA value according to some embodiments of the present application. Although the method is illustrated in a system level by a UE in the remote side (e.g., the UE 110 as illustrated and shown in FIG. 1) and a BS in the network side (e.g., the terrestrial BS 140 as illustrated and shown in FIG. 1), persons skilled in the art should understand that the method implemented in the remote side and that implemented in the network side can be separately implemented and/or incorporated by other apparatus with the like functions. In addition, although a terrestrial BS, e.g., a gNB is used for illustration, persons skilled in the art should understand that a satellite acting like the terrestrial BS, e.g., a regenerative satellite can also perform the same operation/action. The operation/action illustrated in view of the example of a terrestrial BS shall not be limited to those only be performed by the terrestrial BS. Hereafter the same.

As shown in FIG. 2, in step 201, the network side, e.g., the terrestrial BS 140 as shown in FIG. 1, may transmit first downlink signalling information indicating a TA associated value, which is to be received at a first time instance in the remote side. According some embodiments of the present application, the first downlink signalling information is transmitted via MAC CE or group common downlink control information (DCI). The TA associated value is a value for adjusting, e.g., delaying or advancing a TA value currently used in the UE side.

Correspondingly, in step 202, the remote side, e.g., the UE 110 as shown in FIG. 1, may receive the first downlink signalling information, e.g., MAC CE or group common DC indicating a TA associated value at the first time instance.

In step 203, the terrestrial BS 140 will determine a reference TA value based on a second time instance, wherein the second time instance is determined based on second downlink signalling information (also referred to as second downlink signaling, or information indicated by second downlink signalling) or predefined information. When the second time instance is determined based on the second downlink signaling information, the terrestrial BS 140 will also transmit the second downlink information to the UE.

Similarly, in the remote side, in step 204, the UE will determine a reference TA value based on a second time instance, wherein the second time instance is determined based on second downlink signalling information or predefined information. When the second time instance is determined based on the second downlink signaling information, the UE will also receive the second downlink information from the network side.

After determining the reference TA value, the BS and UE can determine the TA value for uplink transmission based on the TA associated value and the reference TA value respectively. For example, in step 205, the terrestrial BS 140 will determine a TA value for uplink transmission based on the TA associated value and the reference TA value. In step 206, the UE will determine a TA value for uplink transmission based on the TA associated value and the reference TA value.

There are various schemes for determining the second time instance and reference TA value according to embodiments of the present application.

For example, in some embodiments of the present application, determining a reference TA value based on the second time instance may include: determining the reference TA value based on geographical positions of a satellite and UE at the second time instance.

In some embodiments of the present application, determining a reference TA value based on the second time instance may include: determining the second time instance based on a time instance associated with a UL transmission and a differential value, wherein the differential value is a time domain difference between the time instance for reception of the UL transmission and the second time instance. The differential value is indicated by the second signalling information or predefined. When the second time instance is determined, the geographical positions of a satellite and a reference point (e.g. a point on the earth) at the second time instance can be determined. And the propagation delay Pd #1 at the second time instance between the satellite and the reference point can be determined.

The UL transmission is determined to be the latest UL transmission before the time instance for reception of the first downlink signaling minus a time domain duration. For example, the reception of the first downlink signaling is at time instance TI #1, and the time domain duration is Td #1, and there are three UL transmissions UL #1, UL #2, and UL #3 at time instance (TI #1-Td #1-3), time instance (TI #1-Td #1-1), (TI #1-Td #1+5), respectively. Then the latest UL transmission determined is UL #2. There is a TA value associated with the determined UL transmission. The TA value may be determined autonomously by the UE itself, indicated by the gNB or a combination of both. The TA value associated with the UL transmission is to be determined when to perform uplink transmission with respect to the DL reception timing. Accordingly, when a UL transmission is determined, the associated TA value TA #U is also determined.

The UL transmission is performed by a UE, and is received by a gNB. A time instance TI #6 for reception of the corresponding UL transmission is also determined. From the UE side, the UL transmission time instance is known to the UE, and the UL reception time instance is determined by the UL transmission time instance plus the propagation delay between the UE and the satellite. The propagation delay can be determined by the geographical position of a point on earth and the satellite position. At the gNB or satellite side, the UL reception time instance is determined by blind detection of uplink signals within a time domain window. The starting and ending of the window is determined by at least one of the transmission time instance of: the first downlink signaling, the propagation delay between the satellite and the UE and the common timing offset, cell specific time domain offset between DL reception and UL transmission, etc. For example, the first DL signaling is transmitted at TIS #1, the propagation delay between satellite and a reference point on earth is Pde #1, and the estimated reception time instance of the first DL signaling is at time instance (TIS #1+Pde #1). In the case that a time domain duration between DL reception and UL transmission, is determined to be Td #1, the estimated UL transmission is performed at time instance (TIS #1+Pde #1-Td #1). In the case that the estimated propagation delay between the UE and satellite when performing the UL transmission is Pde #2, the estimated reception time instance is at time instance (TIS #1+Pde #1-Td #1+Pde #2). The starting and ending of the window can be determined by (TIS #1+Pde #1-Td #1+Pde #2). The value of TIS #1, Pde #1, Td #1, Pde

2 may be within a range rather than a specific value considering different UEs within a coverage area, so that the window can be determined.

After determination of a time instance TI #6 for reception of the corresponding UL transmission, the geographical position of the satellite and UE at TI #6 can be determined. Then, the propagation delay Pd #2 between the satellite and UE at time instance TI #6 can be determined. Based on Pd #1, Pd #2 and TA #U, the reference TA value can be determined. For example, the reference TA value is determined to be (TA #U+2*(Pd #1–Pd #2)).

In some embodiments of the present application, the second downlink signalling information may indicate a time domain duration to determine the second time instance. The time domain duration is determined by at least one of: a cell specific time domain offset between downlink reception and uplink transmission, the largest propagation delay between a satellite and a UE within a coverage area, and a common timing offset. Based on the time domain duration, the second time instance may be determined in various manners. For example, in some embodiments of the present application, the second time instance is determined to be a time instance for the latest uplink transmission before that calculated by the first time instance minus the time domain duration. In some embodiments of the present application, the second time instance is determined by a predefined or configured value and a time instance for the latest uplink transmission before that calculated by the first time instance minus the time domain duration. The predefined or configured value may be a propagation delay between a satellite and a UE or the largest propagation delay between a satellite and all UEs within a coverage area.

In some embodiments of the present application, the second time instance is determined to be the same as the first time instance.

In some embodiments of the present application, the second time instance is determined by the first time instance and a predefined or configured value. The predefined or configured value is determined by a propagation delay between a satellite and a UE. The predefined or configured value is within a range in the time domain between a time instance calculated by the first time instance minus the largest propagation delay within a coverage area and the first time instance. The predefined or configured value can be in a unit of millisecond, second, slot, symbol or number of uplink transmissions. In the case that the predefined or configured value is in a unit of slot or symbol, a SCS is configured or determined based on the frequency band for the uplink transmission. In the case that the predefined or configured value is in the unit of number of uplink transmissions, the predefined or configured value is determined by counting each uplink transmission or every M uplink transmissions, wherein M is a nature integer larger than 1. In some embodiments of the present application, M is determined by a number of uplink transmissions in a measurement gap.

In some embodiments of the present application, the second time instance is determined by a time instance for reception of the second downlink signalling information.

For example, the second time instance is determined by a time domain instance for the nearest uplink transmission after the time instance for reception of the second downlink signaling information. The second downlink signalling information is indicated by a PDCCH or a CSI-RS. The nearest uplink transmission is a PUCCH, PUSCH, PRACH or SRS. In some embodiments of the present application, the nearest uplink transmission is transmitted in a preconfigured resource or scheduled by downlink control signalling. The time domain difference between reception of the second downlink signalling information and transmission of the nearest uplink transmission is configured or predefined.

In another example, the second time instance is further determined by a time domain duration larger than or equal to a propagation delay between a satellite and a UE. The second time instance is a time instance for the latest uplink transmission before the time instance for reception of the second downlink signalling information minus the time domain duration. In some embodiments of the present application, the time domain duration is configured or determined based on graphical positions of the satellite and a UE. In some other embodiments of the present application, the time domain duration is determined by at least one of: a cell specific time domain offset between downlink reception and uplink transmission, the largest propagation delay between a satellite and a UE within a coverage area, and a common timing offset.

Besides the above basic solutions, more details will be illustrated in various embodiments of the present application hereafter. Generally, three exemplary schemes are proposed to determine TA value according to some embodiments of the present application. Persons skilled in the art should understand that these schemes are just for cataloging solutions or manners that can be illustrated in similar way or in view of the same or similar figures, and should not be used as limitation to the present application. Meanwhile, considering the consistency between the remote side and network side, although the following embodiments are specifically illustrated in the perspective of a UE, persons skilled in the art should understand that the illustrated schemes/solutions are also adaptive to the network side.

Scheme 1

In Scheme 1, when determining the TAC (timing advance command), the BS, e.g., a gNB may determine whether to adjust the TA valve, i.e., whether to delay or advance the uplink transmission based on received UL signal(s). Meanwhile, the BS may also determine whether to pre-compensate the movement of the satellite when determining the TAC. After the BS determines the time instance for determining the TAC, which may be determined based on pre-compensation or not, the BS will indicate the determined time instance for determining the TAC (corresponding to the second time instance mentioned in the above embodiments in view of FIG. 2) to the UE via DL signalling(s) in various manners, so that the UE can correctly determine the TA value. Exemplary manners on how to indicate the determined time instance, i.e., the second time instance and how to determine the TA value under Scheme 1 are illustrated in view of FIG. 3 in the following.

Figure 3:
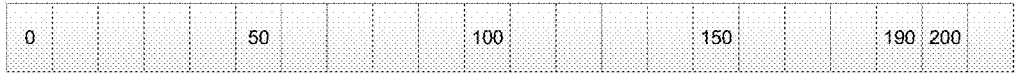
FIG. 3 shows an exemplary diagram of exemplary DL reception (Rx) and UL transmission (Tx) in a UE and DL transmission and UL reception in a BS respectively in the time domain to illustrate Scheme 1 according to some embodiments of the present application.
Figure 3:
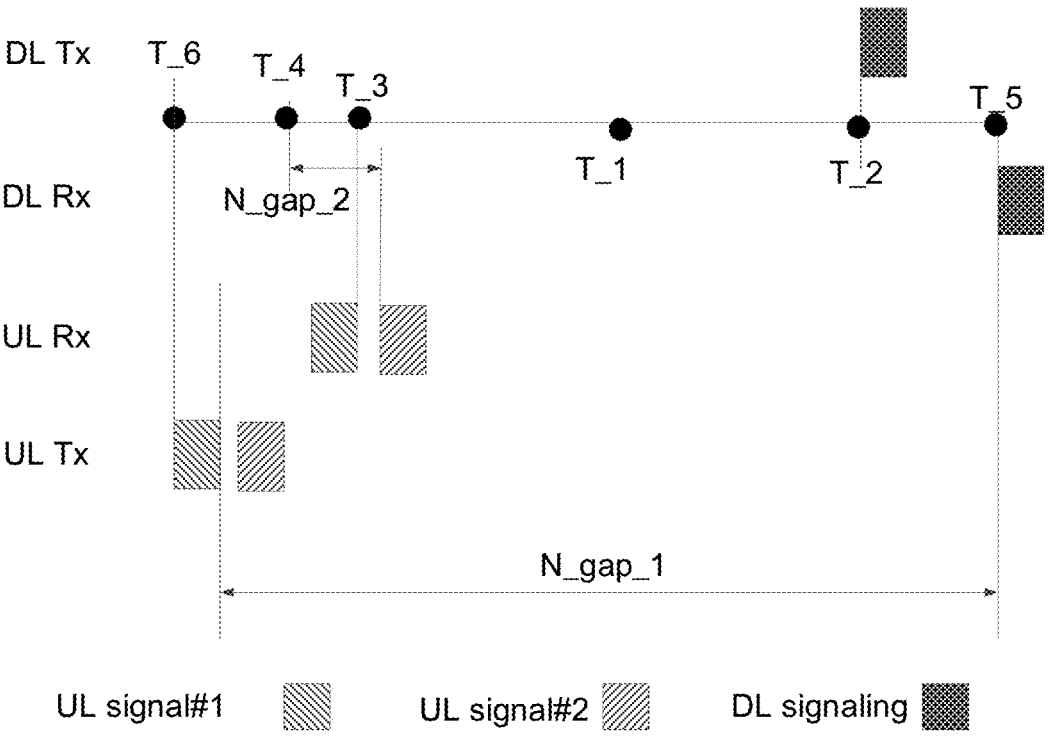

Specially, FIG. 3 shows an exemplary diagram of exemplary DL reception (Rx) and UL transmission (Tx) in a UE and DL transmission and UL reception in a BS respectively in the time domain to illustrate Scheme 1 according to some embodiments of the present application. As shown in FIG. 3, it is supposed:

T_1: is the determined (or selected) time instance for determining TAC, which is between T_6 and T_5, wherein the time domain difference between T_1 and T_6 or the time domain difference between T_1 and T_5 can be configured;

T_2: is the starting time instance of DL signalling transmission at the satellite side, wherein the DL signalling may be a MAC CE or a group common DCI carrying TAC indicating a TA associated value;

T_3: is the ending time instance of reception of UL signal #1 at the satellite side;

T_4: is the starting time instance of a UL signal monitoring window at the satellite side, wherein the difference between T_4 and T_6 is the smallest propagation delay within a cell, and thus T_4 is determined by T_6 and the smallest propagation delay in the cell;

T_5: is the starting time instance of DL signalling reception at the UE side, wherein the DL signalling may be a MAC CE or a group common DCI carrying TAC, which is also corresponding to the first time instance mentioned in embodiments in view of FIG. 2;

T_6: is the starting time instance of transmission of UL signal #1 at the UE side; UL signal #1: is the latest UL signal before the time instance calculated by (T_5– N_gap_1) and thus is determined by T_5 and N_gap_1 at the UE side.

N_gap_1: is a predefined or configured value (or gap) in the time domain; and is explicitly configured to the UE or implicitly determined at the UE by other signalling (s); and N_gap_2 is the window size, corresponding to the differential propagation delay within the cell.

Under Scheme 1, an original time instance for determining TAC is T_3 in FIG. 3, where the BS determines whether to delay or advance the UL transmission based on the received UL signal. The second time instance, which is determined to be the time instance for determining TAC, e.g., T_1 in FIG. 3 may be as the same as T_3 or different from T_3. For example, in the case that the BS determines to pre-compensate the TA change, the BS will determine a new time instance for determining a reference TA value, e.g., T_1 in FIG. 3. Persons skilled in the art should understand that the time domain position shown in FIG. 3 is only for illustration, and should not be deemed as the limitation to the present application.

Manner 1-1: according to some embodiments of the present application, the BS may implicitly indicate the second time instance T_1 via DL signalling indicating the time domain difference (or a time domain duration, hereafter the same) between the second time instance and the DL signalling transmission at the network side, e.g., the satellite side (i.e., the starting time instance T_2 of DL signalling transmission at the satellite side). After receiving the DL signalling(s) for indicating the time domain difference, the UE will firstly determine the time domain difference between the satellite DL transmission (e.g. T_2) and UE DL reception (e.g. T_5), which can be identified by GNSS and satellite ephemeris by the UE. Accordingly, the UE will determine the second time instance, T_1, and then will determine a reference TA value based on the second time instance TAC, T_1. The UE will determine the TA value for UL transmission based on the DL signalling received in T_5 and the reference TA value, e.g., by "the TA value indicated in the DL signalling received in T_5 plus the reference TA vale."

Manner 1-2: according to some embodiments of the present application, the BS may implicitly indicate the second time instance T_1 via DL signalling indicating the time domain difference between the second time instance and the first time instance T_5 at the UE side. The BS side, e.g., a gNB will determine the time domain difference between satellite DL transmission and UE DL reception, which may be caused by UE's TA reporting, satellite position, satellite movement, etc. Similarly, the UE will determine the second time instance T_1, and then will determine a reference TA based on the second time instance T_1. In some embodiments of the present application, the second time instance may be the same as T_5, i.e., the first time instance. The UE will determine the TA value for UL transmission based on the DL signalling received in T_5 and the reference TA value, e.g., by "the TA value indicated in the DL signalling received in T_5 plus the reference TA vale."

Manner 1-3: according to some embodiments of the present application, the BS may implicitly indicate the second time instance T_1 via DL signalling indicating the time domain difference between the second time instance and the time instance T_6 of UL signalling transmission at the UE side. Similarly, the UE will determine the second time instance T_1, and then will determine a reference TA value based on the second time instance T_1. The UE will determine the TA value for UL transmission based on the DL signalling received in T_5 and the reference TA value, e.g., by "the TA value indicated in the DL signalling received in T_5 plus the reference TA vale." For example, a UL signal will be identified or determined firstly at the UE side. The UL signal can be determined to be the latest UL signal whose time domain difference to the TAC reception, e.g., T_5 is larger than a threshold. The threshold can be predefined in 3GPP specification(s), explicitly configured or implicitly determined by the cell specific K-offset value, or the common timing offset value etc.

Manner 1-4: according to some embodiments of the present application, the BS may implicitly indicate the second time instance T_1 via DL signalling indicating the time domain difference between the second time instance and the time instance T_3 of UL signalling reception at the network side, e.g., the satellite side. Similarly, the UE will determine the second time instance T_1, and then will determine a reference TA value based on the second time instance T_1. The UE will determine the TA value for UL transmission based on the DL signalling received in T_5 and the reference TA value, e.g., by "the TA value indicated in the DL signalling received in T_5 plus the reference TA vale." For example, a UL signal will be identified or determined firstly at the UE side, which can be determined in the same way as that in Manner 1-3. The UE will then determine the time domain difference between the UL transmission and UL reception at the satellite side, e.g. the time domain difference between T_6 and T_3, which is based on GNSS and satellite ephemeris. The second time instance can be the same as or different from the time instance for UL reception, e.g., T_3. In the case that the second time instance is the same as the time instance for UL reception, the indicated time domain difference is 0.

Manner 1-5: according to some embodiments of the present application, the second time instance is determined by the first time instance and a predefined or configured value. The predefined or configured value can be predefined in 3GPP specification(s) or is indicated by DL signalling information (e.g., the second signalling information illustrated in view of FIG. 2). For example, the predefined or configured value may be determined by a propagation delay between a satellite and the UE. In another example, the predefined or configured value may be within a range. The smallest value in the range can be calculated by the first time instance minus the largest propagation delay within a coverage area, and the largest value in the range is the first time instance. That is, the time instance T_5 and T_6 are determined by the farthest UE within the cell rather than a specific UE within the cell.

The predefined or configured value may be in a unit of millisecond, second, slot, symbol or number of uplink transmissions. In the case that the predefined or configured value is in a unit of slot or symbol, a reference SCS is configured or determined, e.g., based on the frequency band (e.g., 15 KHz or 60 KHz) for the uplink transmission. In the case that the predefined or configured value is in the unit of number of uplink transmissions, the predefined or configured value is determined by counting each uplink transmission or every M uplink transmissions, wherein M is a nature integer larger than 1. M can be determined by a number of uplink transmissions in a measurement gap.

The predefined or configured value can be an absolute time domain value or a time domain difference. For example, in the case that the predefined or configured value is in a unit of number of uplink transmissions, then the predefined or configured value being 3 means the second time domain instance is the third uplink transmission since T_6. For another example, the predefined or configured value is in a unit of number of uplink transmissions and measurement gap configurations. In this case, the predefined or configured value is determined by counting every M uplink transmissions, and M is determined by the measurement gap configuration. For example, the measurement gap is configured with periodicity 5, and offset is 0. Then, the predefined or configured value being 3 means the second time domain instance is the 15th uplink transmission since T_6 due to 3*5 being 15.

Based on any manner listed above, the UE can determine the second time instance, e.g. T_1, which is used by the terrestrial BS, e.g., a gNB to determine the TAC transmitted in DL signalling. With the information on the second time instance, when there is a UL transmission, the UE can only per-compensate the TA change between T_1 and corresponding UL transmission, and there is no redundancy or contradiction between the gNB and UE on the TA pre-compensation or update.

In addition, although most manners of Scheme 1 are related to BS indicating the second time instance for determining, in some cases, e.g., the predefined value in manner 1-5, the UE may directly determine the second time instance based on the predefined value. The predefined value related solution is similar to that configured by signalling information, and thus not separately illustrated, which should not be used to limit the scope of the present application.

Scheme 2

In Scheme 2, the network, e.g., a gNB will indicate a time domain duration to determine the second time instance. According to some embodiments of the present application, the time domain duration is determined by at least one of: a cell specific time domain offset between downlink reception and uplink transmission, the largest propagation delay between a satellite and all UEs within a coverage area, and a common timing offset. The uplink transmission is determined as in the same as that received in T_6 shown in FIG. 3 in some embodiments of the present application.

In some embodiments of the present application, the second time instance is determined to be a time instance, e.g., T_3 for the uplink reception at the satellite side. The uplink reception is determined by the latest uplink transmission at the UE side before that calculated by the first time instance minus the time domain duration and the propagation delay between a satellite and a UE.

In some embodiments of the present application, the second time instance is determined to be a time instance, e.g., T_3 for the uplink reception at satellite side. The uplink reception is determined by the latest uplink transmission at the UE side before that calculated by the first time instance minus the time domain duration and the largest propagation delay between a satellite and all UEs within a coverage area.

In some embodiments of the present application, the second time instance is determined to be a time instance, e.g., T_1. Firstly, a time instance (e.g. T_6) for uplink reception is determined by the latest uplink transmission at the UE side before that calculated by the first time instance minus the time domain duration and the propagation delay between a satellite and a UE. Secondly, a predefined or configured value is determined. Then the second time instance is determined as T_6 plus the predefined or configured value, e.g., a time domain difference between T_3 and T_1 shown in FIG. 3. Similarly, the predefined or configured value may be in a unit of millisecond, second, slot, symbol or number of uplink transmissions.

Similar to Scheme 1, the UE can determine the second time instance, e.g. T_1, which is used by the terrestrial BS, e.g., a gNB to determine the TAC transmitted in DL signalling. With the information on the second time instance, when there is a UL transmission, the UE can only per-compensate the TA change between T_1 and corresponding UL transmission, and there is no redundancy or contradiction between the gNB and UE on the TA pre-compensation or update.

Scheme 3

In Scheme 3, the second time instance is determined by a time instance for reception of the second downlink signalling information. A second DL signalling is transmitted from a gNB to a UE for determining a reference TA value. The second DL signalling can be before or after the UL signal or channel for determining a TAC.

Manner 3-1: According to some embodiments, the second time instance is determined by a time domain instance for the nearest uplink transmission after the time instance for reception of the second downlink signaling information. That is, the second DL signalling is before the UL signal or channel for determining a TAC.

Figure 4:
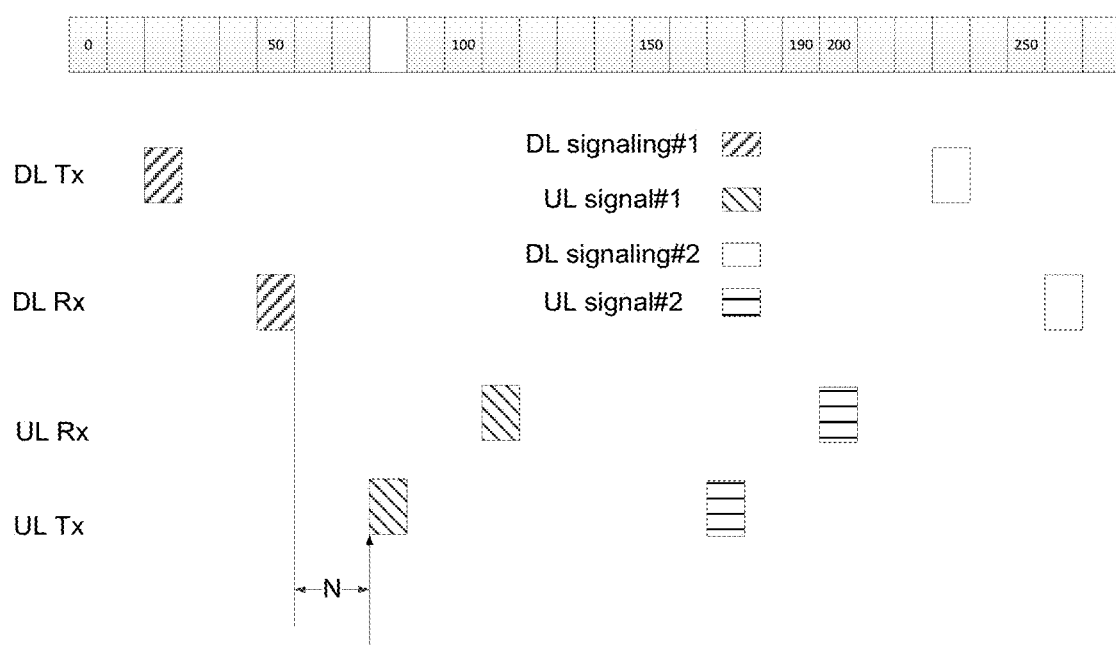
FIG. 4 shows an exemplary diagram of exemplary DL reception (Rx) and UL transmission (Tx) in a UE and DL transmission and UL reception in a BS respectively in the time domain to illustrate Manner 3-1 according to some embodiments of the present application.

FIG. 4 shows an exemplary diagram of exemplary DL reception (Rx) and UL transmission (Tx) in a UE and DL transmission and UL reception in a BS respectively in the time domain to illustrate Manner 3-1 according to some embodiments of the present application.

As shown in FIG. 4, DL signaling #1 is the second downlink signalling for determining the reference TA value. UL signal #1 is the nearest uplink transmission (or the first uplink transmission) after the time instance for reception of the second downlink signalling. DL signaling #2 is a downlink signalling indicating a TAC. UL signal #2 is another uplink transmission except the nearest uplink transmission. The time domain difference between DL signaling #1 and the nearest uplink transmission is N, which can be defined in a unit similar to M. DL signaling #1 and DL signaling #2 are transmitted from a gNB to the UE, and the satellite will relay the DL signalling as a transparent satellite without any impact on FIG. 4.

In some embodiments of the present application, the second downlink signalling information is indicated by a PDCCH or a CSI-RS, that is, the second downlink signalling is PDCCH or CSI-RS. For example, the PDCCH is associated with a specific monitoring occasion or with a specific radio network temporary identifier (RNTI). The nearest uplink transmission is a PUCCH, PUSCH, PRACH or SRS, which is transmitted in a preconfigured resource or scheduled by downlink control signalling, e.g., scheduled by radio resource control (RRC) signalling or physical layer signaling. For example, the SRS is configured with specific usage, e.g. with the high layer parameter "usage" configured as "TA sounding." The time domain difference, e.g., N between the reception of the second downlink signalling information and the transmission of the nearest uplink transmission is configured or predefined. That is, the nearest uplink transmission is configured or predefined, which can be triggered by the reception of the second downlink signaling information.

The UE may determine a reference TA value to be the current TA value, e.g., TA1 used for the nearest UL transmission, e.g., UL signal #1 after the reception of the second DL signalling, e.g., DL signaling #1. After the nearest UL transmission UL signal #1, before that the UE receives a next DL signalling indicating a TAC, e.g., DL signaling #2, the UE determines the TA value for uplink transmission based on GNSS and satellite ephemeris. In the case that a DL signalling indicating a TAC, e.g., DL signaling #2 is received, the UE determines the TA based on the nearest reference TA value, e.g., TA1 and the received DL signalling indicating a TAC, e.g., DL signaling #2. After a new second DL signalling is received, a new reference TA value will be determined and will replace the previous reference TA value, e.g., TA1.

Manner 3-2: According to some embodiments of the present application, the second time instance is determined by a time domain duration larger than or equal to a propagation delay between a satellite and a UE. The second DL signalling is after the UL signal or channel for determining a TAC.

Figure 5:
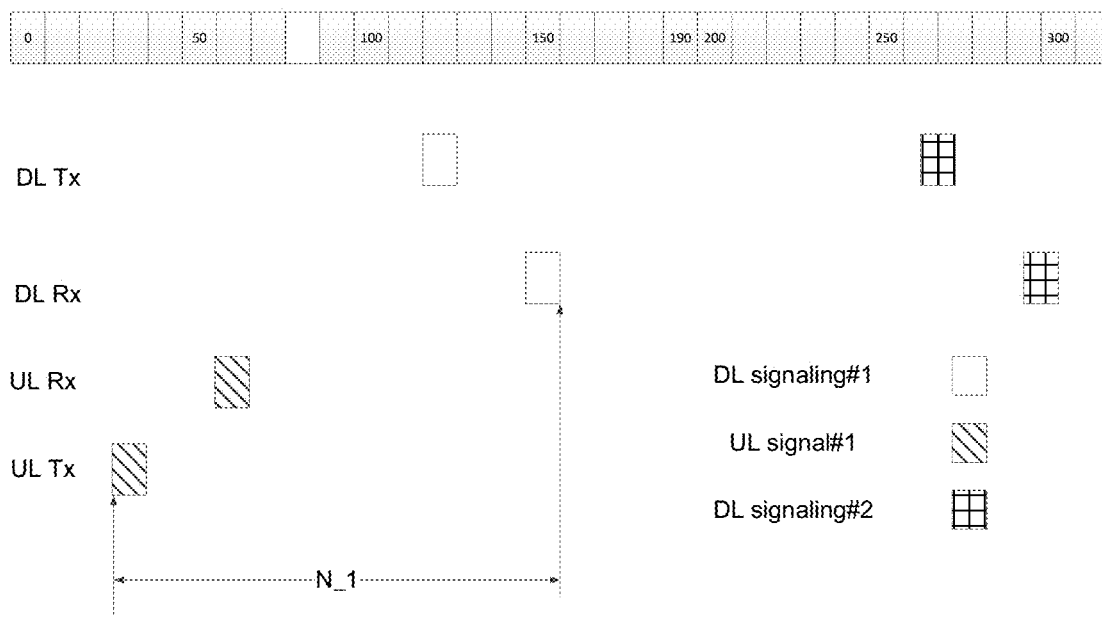
FIG. 5 shows an exemplary diagram of exemplary DL reception (Rx) and UL transmission (Tx) in a UE and DL transmission and UL reception in a BS respectively in the time domain to illustrate Manner 3-2 according to some embodiments of the present application.

FIG. 5 shows an exemplary diagram of exemplary DL reception (Rx) and UL transmission (Tx) in a UE and DL transmission and UL reception in a BS respectively in the time domain to illustrate Manner 3-2 according to some embodiments of the present application.

As shown in FIG. 5, there are UL signal #1, DL signaling #1 and DL signaling #2. DL signaling #1 is the second downlink signalling for determining a reference TA. N_1 is the time domain duration. UL signal #1 is the latest uplink transmission before the time instance for reception of the second downlink signalling minus the time domain duration. DL signaling #2 is a DL signalling indicating a TAC.

In some embodiments of the present application, the second time instance is a time instance for the latest uplink transmission, e.g., UL signalling #1 before the time instance for reception of the second downlink signalling minus a time domain duration. The time domain duration N_1 is configured or determined based on graphical positions of the satellite and a UE. In some other embodiments of the present application, the time domain duration is determined by at least one of: a cell specific time domain offset between downlink reception and uplink transmission, a largest propagation delay between a satellite and all UEs within a coverage area, and a common timing offset. The reference TA value will be determined based on the TA value of the latest UL signal transmission.

Figure 6:
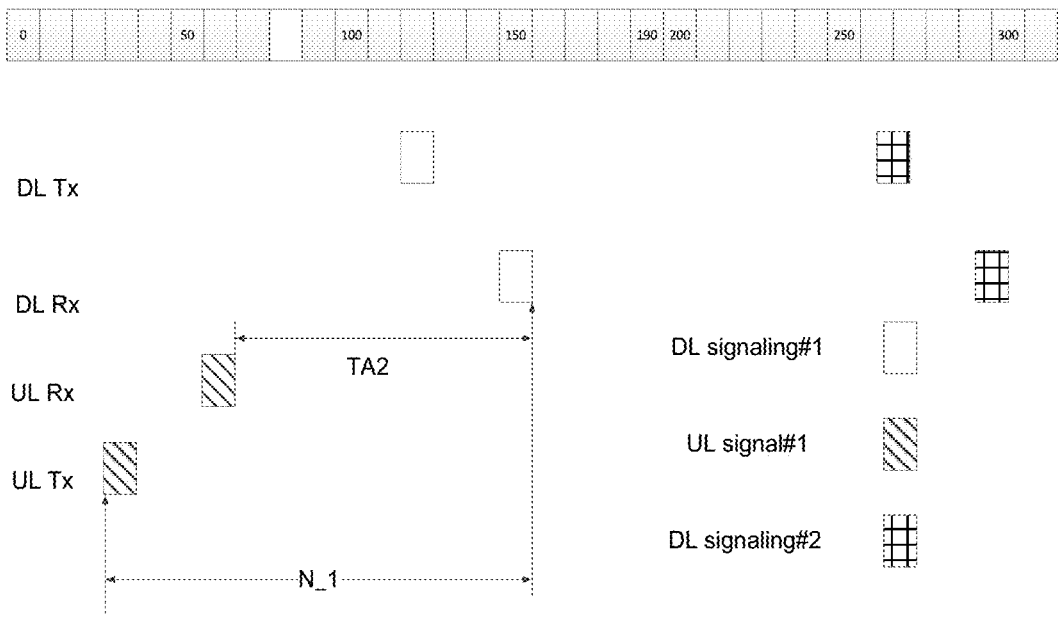
FIG. 6 shows an exemplary diagram of exemplary DL reception (Rx) and UL transmission (Tx) in a UE and DL transmission and UL reception in a BS respectively in the time domain to illustrate Manner 3-2 according to some other embodiments of the present application.

FIG. 6 shows an exemplary diagram of exemplary DL reception (Rx) and UL transmission (Tx) in a UE and DL transmission and UL reception in a BS respectively in the time domain to illustrate Manner 3-2 according to some other embodiments of the present application.

As shown in FIG. 6, there are UL signal #1, DL signaling #1 and DL signaling #2. DL signaling #1 is the second downlink signalling for determining a reference TA. N_1 is the time domain duration. UL signal #1 is the latest uplink transmission before the time instance for reception of the second downlink signalling minus the time domain duration. DL signaling #2 is a DL signalling indicating a TAC. TA2 is a differential TA value between the reception of UL signaling #1 at the gNB side or satellite side and the reception of DL signaling #1 in the UE.

In some embodiments of the present application, the time domain duration N_1 is configured or determined based on graphical positions of the satellite and a UE. In some other embodiments of the present application, the time domain duration is determined by at least one of: a cell specific time domain offset between downlink reception and uplink transmission, a largest propagation delay between a satellite and all UEs within a coverage area, and a common timing offset. The second time instance for determining the reference TA value is determined based on the reception of the second DL signalling, e.g., DL signaling #1. The reference TA value is determined based on the TA value of the latest UL signal transmission, UL signal #1 and a differential TA value, e.g., TA2 between the latest UL signal reception at satellite side and the time instance of the second D signalling, e.g., DL signaling #1.

Figure 7:
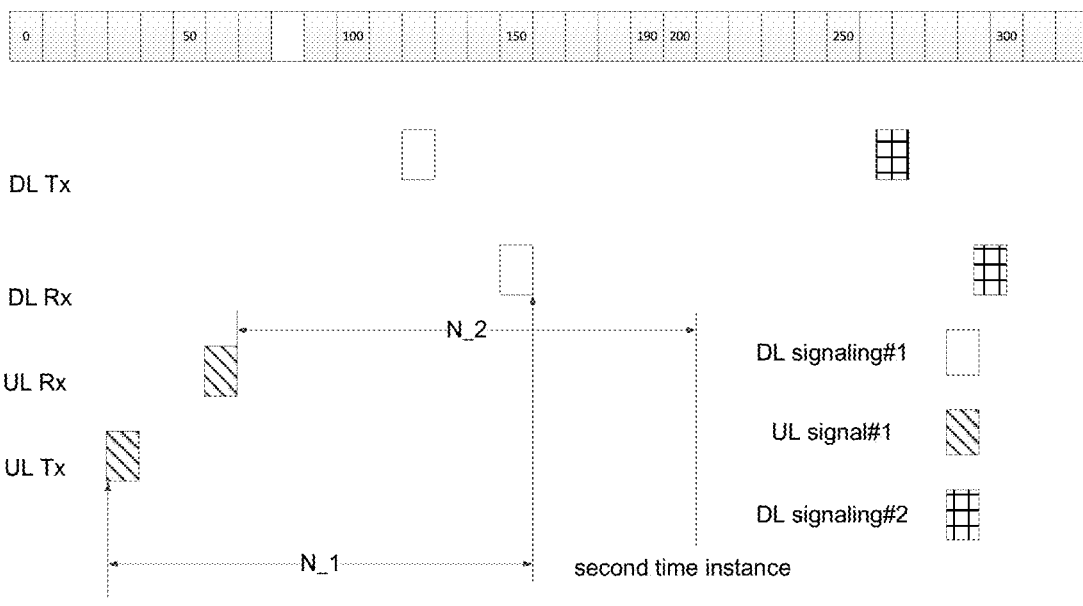
FIG. 7 shows an exemplary diagram of exemplary DL reception (Rx) and UL transmission (Tx) in a UE and DL transmission and UL reception in a BS respectively in the time domain to illustrate Manner 3-2 according to some yet other embodiments of the present application.

FIG. 7 shows an exemplary diagram of exemplary DL reception (Rx) and UL transmission (Tx) in a UE and DL transmission and UL reception in a BS respectively in the time domain to illustrate Manner 3-2 according to some yet other embodiments of the present application.

As shown in FIG. 7, there are UL signal #1, DL signaling #1 and DL signaling #2. DL signaling #1 is the second downlink signalling for determining a reference TA. N_1 is the time domain duration. UL signal #1 is the latest uplink transmission before the time instance for reception of the second downlink signalling minus the time domain duration. DL signaling #2 is a DL signalling indicating a TAC. N_2 is configured or predefined value between the second time instance for determining the reference value and the time instance for the reception of UL signal #1 at the gNB.

In some embodiments of the present application, the time domain duration N_1 is configured or determined based on graphical positions of the satellite and a UE. In some other embodiments of the present application, the time domain duration is determined by at least one of: a cell specific time domain offset between downlink reception and uplink transmission, a largest propagation delay between a satellite and all UEs within a coverage area, and a common timing offset. The second time instance for determine the reference TA value is determined based on the reception of the second DL signalling, e.g., DL signaling #1 plus a predefined or configured value, e.g., N_2. The reference TA value is determined based on the TA value of the latest UL signal transmission, UL signal #1 and a predefined or configured value, e.g., N_2. The differential TA between the TA of the latest UL transmission and the TA of the second time instance should be determined. The reference TA can then be determined based on the TA of the latest UL transmission and the different TA. The differential TA can be determined based on geographical positions of the satellite and a reference point on earth (e.g. cell center or the UE's position) at two different time instances. The first time instance is the time instance for reception of the latest UL transmission and the second time instance is the first time instance plus N_2.

Embodiments of the present application also propose an apparatus for determining timing relationship between DL reception and UL transmission. For example, FIG. 8 illustrates a block diagram of an apparatus 800 for determining TA value according to some embodiments of the present application.

Figure 8:
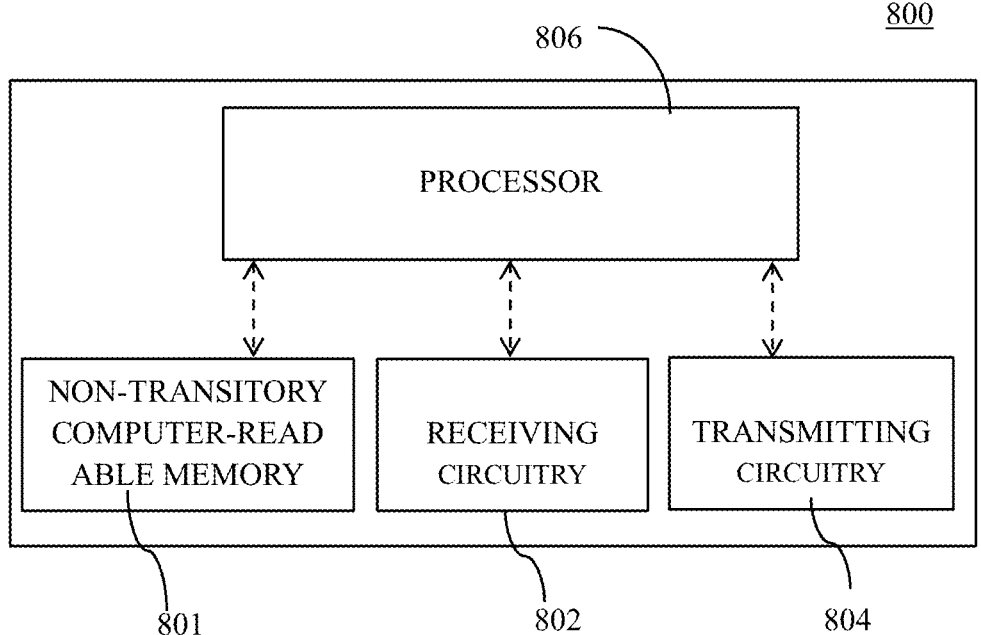
FIG. 8 illustrates a block diagram of an exemplary apparatus according to some embodiments of the present application.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The apparatus 800 may be a network side apparatus (e.g., a BS) configured to perform a method illustrated in FIG. 2, or the like, or a remote unit (e.g., a UE) configured to perform a method illustrated in FIG. 2 or the like.

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 can be combined into a single device, such as a transceiver. In certain embodiments of the present application, the apparatus 800 may further include an input device, a memory, and/or other components.

For example, in some embodiments of the present application, the non-transitory computer-readable medium 801 may have stored thereon computer-executable instructions to cause a processor to implement the method with respect to the UE as described above. For example, the computer-executable instructions, when executed, cause the processor 806 interacting with receiving circuitry 802 and transmitting circuitry 804, so as to perform the steps with respect to the UE depicted in FIG. 2, 4, 5, 6, or 7.

In some embodiments of the present application, the non-transitory computer-readable medium 801 may have stored thereon computer-executable instructions to cause a processor to implement the method with respect to the BS as described above. For example, the computer-executable instructions, when executed, cause the processor 806 interacting with receiving circuitry 802 and transmitting circuitry 804, so as to perform the steps with respect to the BS depicted in FIG. 2, 4, 5, 6, or 7.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more.

While this disclosure has been described with specific embodiments thereof, it is evident that many alternatives, modifications, and variations may be apparent to those skilled in the art. For example, various components of the embodiments may be interchanged, added, or substituted in the other embodiments. In addition, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed:

1. A method performed by a user equipment (UE), the method comprising:

receiving first downlink signaling information indicating a timing advance (TA) associated value at a first time instance;

determining a reference TA value based on a second time instance and a third time instance, the second time instance being determined based on second downlink signaling information or predefined information and the third time instance being associated with an uplink transmission and a differential value; and determining a TA value for uplink transmission based on the TA associated value and the reference TA value.

2. A user equipment (UE) for wireless communication, comprising:

at least one memory; and at least one processor coupled with the at least one memory and configured to cause the UE to:

receive first downlink signaling information indicating a timing advance (TA) associated value at a first time instance;

determine a reference TA value based on a second time instance and a third time instance, the second time instance being determined based on second downlink signaling information or predefined information and the third time instance being associated with an uplink transmission and a differential value; and determine a TA value for uplink transmission based on the TA associated value and the reference TA value.

3. The UE of claim 2, wherein to determine the reference TA value based on the second time instance, the at least one processor is configured to cause the UE to:

determine the reference TA value based on geographical positions of a satellite and the UE at the second time instance.

4. The UE of claim 2, wherein the differential value is a predefined or configured differential value that is a time domain difference between a time instance for reception of the uplink transmission and the second time instance.

5. The UE of claim 2, wherein the second downlink signaling information indicates a time domain duration to determine the second time instance.

6. The UE of claim 5, wherein the time domain duration is determined by at least one of: a cell specific time domain offset between downlink reception and uplink transmission, a largest propagation delay between a satellite and all UEs within a coverage area, and a common timing offset.

7. The UE of claim 5, wherein the second time instance is determined to be a time instance for a latest uplink transmission before that calculated by the first time instance minus the time domain duration.

8. The UE of claim 2, wherein the second time instance is determined to be a same time instance as the first time instance.

9. The UE of claim 2, wherein the second time instance is determined by the first time instance and a predefined or configured value.

10. The UE of claim 9, wherein the predefined or configured value is in a unit of millisecond, second, slot, symbol or number of uplink transmissions.

11. The UE of claim 10, wherein in a case that the predefined or configured value is in the unit of slot or symbol, a reference subcarrier spacing (SCS) is configured or determined based on frequency band for the uplink transmission.

12. The UE of claim 11, wherein in the case that the predefined or configured value is in the unit of number of uplink transmissions, the predefined or configured value is determined by counting each uplink transmission or every M uplink transmissions, wherein M is an integer larger than 1.

13. The UE of claim 2, wherein the second time instance is determined by a time instance for reception of the second downlink signaling information.

14. The UE of claim 13, wherein the second time instance is determined by a time domain instance for a nearest uplink transmission after the time instance for reception of the second downlink signaling information.

15. The UE of claim 14, wherein the second time instance is further determined by a time domain duration larger than or equal to a propagation delay between a satellite and the UE.

16. The UE of claim 15, wherein the second time instance is a time instance for a latest uplink transmission before the time instance for reception of the second downlink signaling information minus the time domain duration.

17. A method performed by a base station, the method comprising:

transmitting first signaling information indicating a timing advance (TA) associated value, which is to be received at a user equipment (UE) at a first time instance;

determining a reference TA value based on a second time instance and a third time instance, the second time instance being determined based on second signaling information or predefined information and the third time instance being associated with an uplink transmission and a differential value; and determining a TA value for uplink transmission based on the TA associated value and the reference TA value.

18. The method of claim 17, wherein determining the reference TA value based on the second time instance comprises:

determining the reference TA value based on geographical positions of a satellite and the UE at the second time instance.

19. The method of claim 17, wherein the differential value is a predefined or configured differential value that is a time domain difference between a time instance for reception of the uplink transmission and the second time instance.

20. A base station for wireless communication, comprising:

at least one memory; and at least one processor coupled with the at least one memory and configured to cause the base station to:

transmit first signaling information indicating a timing advance (TA) associated value, which is to be received at a user equipment (UE) at a first time instance;

determine a reference TA value based on a second time instance and a third time instance, the second time instance being determined based on second signaling information or predefined information and the third time instance being associated with an uplink transmission and a differential value; and determine a TA value for uplink transmission based on the TA associated value and the reference TA value.

* * * * *